US006907367B2

(12) United States Patent
Baggenstoss

(10) Patent No.: US 6,907,367 B2
(45) Date of Patent: Jun. 14, 2005

(54) TIME-SERIES SEGMENTATION

(75) Inventor: Paul M. Baggenstoss, Newport, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 306 days.

(21) Appl. No.: 09/949,409

(22) Filed: Aug. 31, 2001

(65) Prior Publication Data
US 2003/0046036 A1 Mar. 6, 2003

(51) Int. Cl.[7] .......................... G01L 11/00; G06F 19/00
(52) U.S. Cl. .............................. 702/77; 702/66; 702/76; 702/189; 702/190; 704/236; 704/239
(58) Field of Search ........................... 702/675, 75–77, 702/66, 126, 189, 190, 194, 124, 57, 182; 704/217, 219, 236, 251, 255, 256, 239

(56) References Cited

U.S. PATENT DOCUMENTS

| | | | | | |
|---|---|---|---|---|---|
| 4,837,830 | A | * | 6/1989 | Wrench et al. ............. | 704/238 |
| 5,671,327 | A | * | 9/1997 | Akamine et al. ........... | 704/219 |
| 5,675,706 | A | * | 10/1997 | Lee et al. .................... | 704/256 |
| 5,918,223 | A | * | 6/1999 | Blum et al. ..................... | 707/1 |
| 5,918,225 | A | * | 6/1999 | White et al. ................... | 707/3 |
| 6,101,463 | A | * | 8/2000 | Lee et al. .................... | 704/207 |
| 6,195,639 | B1 | * | 2/2001 | Feltstrom et al. ........... | 704/252 |
| 6,226,606 | B1 | * | 5/2001 | Acero et al. ................. | 704/218 |
| 6,330,428 | B1 | * | 12/2001 | Lewis et al. ............. | 455/67.11 |
| 6,438,522 | B1 | * | 8/2002 | Minowa et al. ............. | 704/258 |

OTHER PUBLICATIONS

Mondragon et al., "Speech Recognition Techniques using Acoustic Segmentation." Universidad Nacional Atonoma de Mexico. (no date).*
Kay et al., "Multidimensional Probability Density Function Approximations for Detection, Classification, and Model Order Selection." IEEE Transactions on Signal Processing. vol.: 49 Issue: 10 , Oct. 2001. Page(s): 2240–2252.*
Lo et al., "Computing Circular Auto–Correlation of Randomly Sampled Sequences " Proceedings of 1997 IEEE International Symposium on Circuits and Systems. vol.: 4 , Jun. 9–12, 1997. Page(s): 2657–2660.*
Svendsen et al., "On the Automatic Segmentation of Speech Signals", IEEE International Conference on Acoustics, Speech, and Signal Processing, vol.: 12 , Apr. 1987 pp.: 77–80.*
Wilpon et al., "A Modified K–Means Clustering Algorithm for Use in Isolated Work Recognition", IEEE Transactions on Acoustics, Speech, and Signal Processing, vol.: 33 , Issue: 3 , Jun. 1985 pp.: 587–594.*
Andre–Obrecht, "A New Statistical Approach for the Automatic Segmentation of Continuous Speech Signals", IEEE Transactions on Acoustics, Speech, and Signal Processing, vol. 36. No. 1. Jan. 1988.*
Delmonte, "SLIM prosodic automatic tools for self–learning instruction", Speech Communication 30 (2000) 145–166. 2000.*

* cited by examiner

Primary Examiner—Marc S. Hoff
(74) Attorney, Agent, or Firm—James M. Kasischke; Michael F. Oglo; Jean-Paul A. Nasser

(57) ABSTRACT

A method for segmenting a signal into segments having similar spectral characteristics is provided. Initially the method generates a table of previous values from older signal values that contains a scoring value for the best segmentation of previous values and a segment length of the last previously identified segment. The method then receives a new sample of the signal and computes a new spectral characteristic function for the signal based on the received sample. A new scoring function is computed from the spectral characteristic function. Segments of the signal are recursively identified based on the newly computed scoring function and the table of previous values. The spectral characteristic function can be a selected one of an autocorrelation function and a discrete Fourier transform. An example is provided for segmenting a speech signal.

15 Claims, 2 Drawing Sheets

TIME-SERIES SEGMENTATION

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1) Field of the Invention

This invention generally relates to a method and system for identifying data segments within a signal by using naturally occurring boundaries in the signal and updating sample-by-sample.

More particularly, the invention is directed to solving the problem of dividing an input signal, such as an acoustic data signal or a speech signal, consisting of multiple "events" into frames where the signal within each frame is statistically "consistent". Once the data has been segmented, detection and classification of events is greatly facilitated. In speech signals, for example, the data becomes segmented into phonetically constant frames or frames in which there are an integer number of pitch periods. This makes determination of pitch more accurate and reliable.

(2) Description of the Prior Art

Prior to this invention, it has not been known how to divide a time-series (signal) into segments with a fine enough resolution corresponding to individual pitch interval boundaries. The current art for optimally segmenting a time-series consists of first segmenting the data into fixed-size segments, then performing a second stage of segmentation to group together numbers of the fixed-size segments into larger blocks. This approach has a resolution no finer than the size of the fixed-size segments.

Because speech signals contain features that are very short in duration, it would be preferable to segment the data to a finer resolution, such as to a resolution of one sample. The current art cannot be used to segment the data to a resolution of one sample because it requires first segmenting to fixed-size segments large enough to extract meaningful features. Furthermore, the existing dynamic-programming solution is computationally impractical because the data has to be processed at each delay and at each segment length.

Thus, a problem exists in the art whereby it is necessary to develop a computationally efficient and practical method of segmenting multiple events into frames to a resolution of one sample necessary to identify individual pitch intervals.

By way of example of the state of the art, reference is made to the following papers, which are incorporated herein by reference. References pertaining to the prior art are contained in the following references:

[1] Euler, S. A.; Juang, B. H.; Lee, C. H.; Soong, F. K., *Statistical Segmentation and Word Modeling Techniques in Isolated Word Recognition*, 1990 International Conference on Acoustics, Speech, and Signal Processing, vol.2, pp. 745–748.

[2] Svendsen, F. Soong, *On the Automatic Segmentation of Speech Signals*, 1987 International Conference on Acoustics, Speech, and Signal Processing, pp. 77–80, Dallas, 1986.

[4] R. Kenefic, *An Algorithm to Partition DFT Data into Sections of Constant Variance*, IEEE Trans AES, July 1998

Referring further to the current state of the art as developed in the field to date, it should be understood that detection and classification of short signals is a high priority for the Navy. Segmentation of a time series is a method that facilitates detection and classification.

In segmentation of short signals, the following is an illustration of the current state of the art. Let there be N samples $x=[x_1 \ldots x_N]$. One would like to divide these samples into a number of segments, for example:

$$x=[x_1 \ldots x_a][x_{a+1} \ldots x_b][x_{b+1} \ldots x_c][x_{c+1} \ldots x_N],$$

such that the total score, Q, where:

$$Q=Q(x_1 \ldots x_a)+Q(x_{a+1} \ldots x_b)+Q(x_{b+1} \ldots x_c)+Q(x_{c+1} \ldots x_N)$$

is as high as possible.

To do this, the score function, Q(n,t), must be known for a segment of length n ending at time t. Assuming it is known, the problem is to find the best number of segments and their start times $\{a, b, c, d \ldots\}$. The standard dynamic-programming approach disclosed in Bellman and also Soong, above, is to first compute the score for all possible segment lengths at all possible end-times. In other words, compute Q(n,t) for $t=n_{min} \ldots N$ and $n=n_{min}$ to $n_{max}$ where $n_{min}$ and $n_{max}$ are the range of allowed segment lengths. The problem is solved by starting at sample $n_{min}$ because the best solution for segmenting the data up to sample $n_{min}$ is immediately known, it is just the value of the score function Q when $n=n_{min}$ and $t=n_{min}$, $Q(n_{min}, n_{min})$. Let this be called $Q_b(n_m)$. The best solutions for later samples are then easily found as follows:

$Q_b(t)=Q(n,t)+Q_b(t-n)$ maximized over n.

Since $Q_b(t-n)$ was already computed, all of the necessary information is available. The value of n for this solution is also saved and is called $n_m(t)$. This process proceeds until $Q_b(N)$, $n_b(N)$. The problem is then solved. The maximum total score is $Q_b(N)$ and the length of the last segment is $n_b(N)$. The other segment lengths are found by working backwards. For example, the length of the next-to-last segment is $n_b(N-n_b(n))$, which was previously stored. This is the standard approach taught in the prior art.

In many problems, it is needed to have the best segments and also to pick the best models for each segment. In speech, for example, it may be necessary to know if a segment is voiced or unvoiced speech or it might be necessary to choose the best model order. Let p be an index that ranges over all possible models. To find the best combination of segment lengths and model indexes, first the score function Q(p,n,t) must be known. A slight modification is then made to the above procedure by carrying out the maximizations at each time over both n and p jointly.

What has been described so far is the standard approach taught by the Bellman and Soong references. The problem with applying the method to speech processing and other fields is that computing the score function is time-consuming and the method is not practical to apply sample-by-sample as data is acquired. Instead, it is necessary to apply the method to a coarse resolution defined by the frame-processing interval taught by Soong. Features of the data finer than the frame processing interval are filtered out of the data.

As mentioned, sample-by-sample processing is normally impractical. If the score function is computed on samples $[x_{t-n+1} \ldots x_t]$, and it is desired to move over one sample to

[$x_{t-n+2} \ldots x_{t+1}$], it is necessary to re-compute the entire score function. This is because the state of the art in signal processing in speech and other fields uses the Fast Fourier Transform (FFT) and a "window" function such as a Hanning window. Window functions are necessary to smooth transitions in the data and eliminate edge effects. This is because the data is processed in "chunks" which are not always aligned with the naturally occurring event boundaries.

It should be understood that the present invention would in fact enhance the functionality of the above cited art by the combined effect of eliminating the window function previously used, and providing sample-by-sample updates.

SUMMARY OF THE INVENTION

Therefore it is an object of this invention to provide an improved method of time series segmentation.

Another object of this invention is to provide a method for dividing a signal into plural segments of data.

Still another object of this invention is to provide a method for dividing a signal into plural segments of data in the absence of a window function.

Yet another object of the invention is to provide a method for dividing a signal into plural segments of data and updating segment scores thereof one sample at a time.

In accordance with one aspect of this invention, there is provided a method for segmenting a signal into segments having similar spectral characteristics is provided. Initially the method generates a table of previous values from older signal values that contains a scoring value for the best segmentation of previous values and a segment length of the last previously identified segment. The method then receives a new sample of the signal and computes a new spectral characteristic function for the signal based on the received sample. A new scoring function is computed from the spectral characteristic function. Segments of the signal are recursively identified based on the newly computed scoring function and the table of previous values. The spectral characteristic function can be a selected one of an autocorrelation function and a discrete Fourier transform. An example is provided for segmenting a speech signal.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to solving the problem of dividing an input signal, such as acoustic data or a speech signal, consisting of multiple "events" into frames where the signal within each frame is statistically "consistent". Once the data has been segmented, detection and classification of events is greatly facilitated. In speech signals, for example, the data becomes segmented into phonetically constant frames or frames in which there are an integer number of pitch periods. This makes determination of pitch more accurate and reliable.

This invention was disclosed by the inventor in the following presentation, which is incorporated by reference herein.

P. M. Baggenstoss et al., *A Theoretically Optimal Probabilistic Classifier Using Class-Specific Features*, 2000 International Conference on Pattern Recognition, Barcelona, Spain, Sep. 2, 2000.

The invention automatically divides an arbitrary time-series signal into arbitrary-length frames or segments wherein the data in each frame is "consistent". This ability to determine a consistent frame of data facilitates detection and classification of each frame of the data as well as the data as a whole. Current detectors locate events only to an FFT frame. The proposed method can locate events to a resolution of one sample. The results of experiments show that the segmentation occurring in the present invention is as good as possible by a human operator.

As indicated above, the problem is to divide a time-series signal such as a digitized audio stream into segments corresponding to the naturally occurring events in the signal. The invention provides a non-windowed processing method (in contrast to the state of the art which uses windowing) which allows recursive update of a spectral feature function such as one of a Discrete Fourier Transform (DFT) and a circular Auto Correlation Function (ACF). This method has the added benefit of causing the resulting segments to be perfectly aligned to event boundaries.

Figure 1:
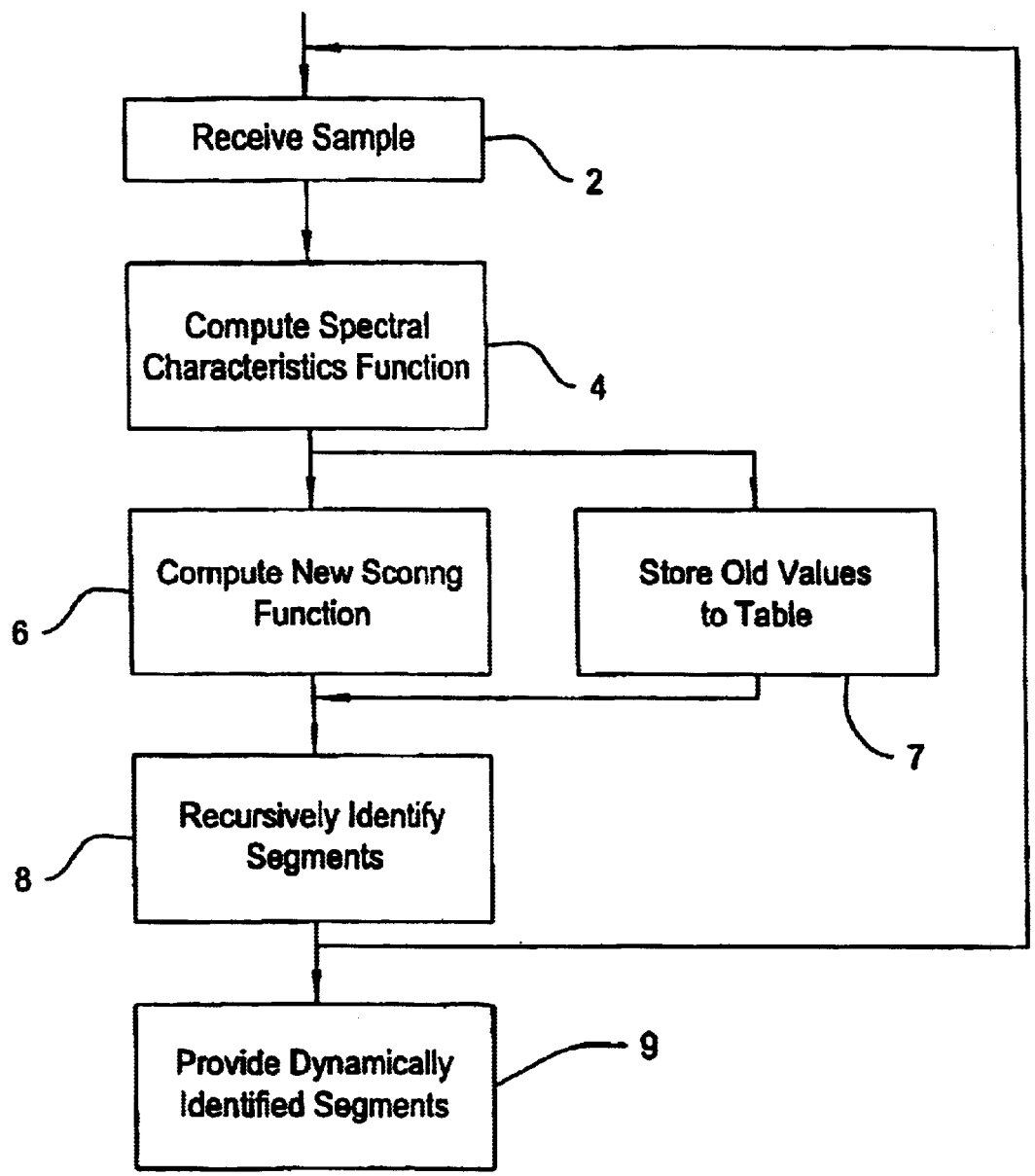
FIG. 1 is a flowchart of the method of the present invention.

FIG. 1. provides a flowchart of the method of the current invention. In step 2, a sample is received from a signal. A spectral characteristics function is calculated from the sample in step 4. A new scoring function is computed in step 6 based on the spectral characteristics function computed in step 4. This new scoring function is computed on a rolling basis by dropping old values as the new values are computed. The old values are stored to a table in step 7. Segments are recursively identified instep 8 from the new scoring function computed in step 6 and the table of previous values maintained in step 7. The method returns to collect additional samples while providing dynamically identified segments in step 9. Further details concerning these steps are provided in the following text.

The method of the present invention allows sample by sample updating of a spectral feature function which does not require a window function. The window function is not necessary because the segments will be exactly aligned to the "event" boundries in the signal. Also, because no window function is used, it is possible to update the score function efficiently by accounting only for the added and dropped samples.

When a spectral feature function such as a discrete Fourier transform (DFT) is computed on samples [$x_{t-n+1} \ldots x_t$], denoted $X_t[k]$ where t is the sample and k is the transform variable, and it is desired to compute it on samples [$x_{t-n+2} \ldots x_{t+1}$], denoted $X_{t+1}[k]$, $X_t[k]$ is related to $X_{t+1}[k]$ by the following equation:

$$X_{t+1}[k] = e^{j2\pi k/n}[X_t[k] + (x_{t-n+1} - x_{t+1})] \tag{1}$$

If the spectral feature function is a circular autocorrelation function (ACF) computed on samples [$x_{t-n+1} \ldots x_t$], denoted $r_t[\tau]$ where $\tau$ is the correlation variable, and it is desired to compute it on samples [$x_{t-n+2} \ldots x_{t+1}$], denoted $r_{t+1}[\tau]$ then:

$$r_{t+1}[\tau] = r_t[\tau] + (x_{t+1} - x_{t-n+1})(x_{t-n+1} - x_{t+-\tau})/n \tag{2}$$

Score functions that are computed from the spectral feature function can be computed efficiently at each sample. Other types of efficiently-computed score functions are also possible. Previous values of the score function for the best segmentation and the length of the last segment can be stored in a table. Upon segmentation, the score and length of the latest value can be utilized with the table values for efficiently obtaining the current best segmentation. Accordingly, at any time the invention using dynamic programming can segment a stream of time series data into segments having like characteristics. These segments can then be classified.

Applying the current invention for speech processing the Autocorrelation function (ACF) is used as the spectral feature function. Because the ACF is sensitive to spectral features in the data, the resulting segments are on boundaries where the spectrum changes.

In speech data, a "reward" is additionally added to the score function for segments matching the pitch interval exactly. To determine the score of a segment, the ACF is computed, and then the Levinson recursion is used to compute the linear prediction error variance for every model order up to a maximum (of about 16). The score for a given model order p on a segment of length n is:

$$Q(p,n)=(-n/2)(\log(\sigma^2[p,n])+1)-(p/2)*\log(n)+K \qquad (3)$$

where n is the segment length and $\sigma^2[p,n]$ is the prediction error variance for model order p, and K is a "reward" value for periodicity. The well-known Levinson-Durbin algorithm can be used to compute $\sigma^2[p,n]$ from the ACF efficiently.

The term $(p/2)*\log(n)$ is the well-known Minimum Description Length (MDL) penalty score. To "reward" the segment for matching the pitch interval, a positive number K is added to $Q(p,n)$ if the ACF of the segment shows "periodicity". To determine periodicity in the speech application, every division factor d=2 up to d=6 is tested. The meaning of d is the number of pitch intervals in the segment. For each value of d, the smallest ACF lag in the set $\{r[0], r[n/d], r[2n/d], \ldots r[n/2]\}$ is determined. $d_{max}$ is determined as the division factor producing the largest minimum ACF value. If $d_{max}$ is greater than a fraction of r[0], it can be labeled as periodic with a division factor $d_{max}$ and thus the period is $n/d_{max}$. The fraction is established by trial and error based on the given application. For speech recognition 0.5 has been found to be an effective fraction. While this only happens rarely, it is bound to happen for some segment (and all segments are tested), thus the method works. The reward value used is a monotonically increasing function of $d_{max}$.

Figure 2:
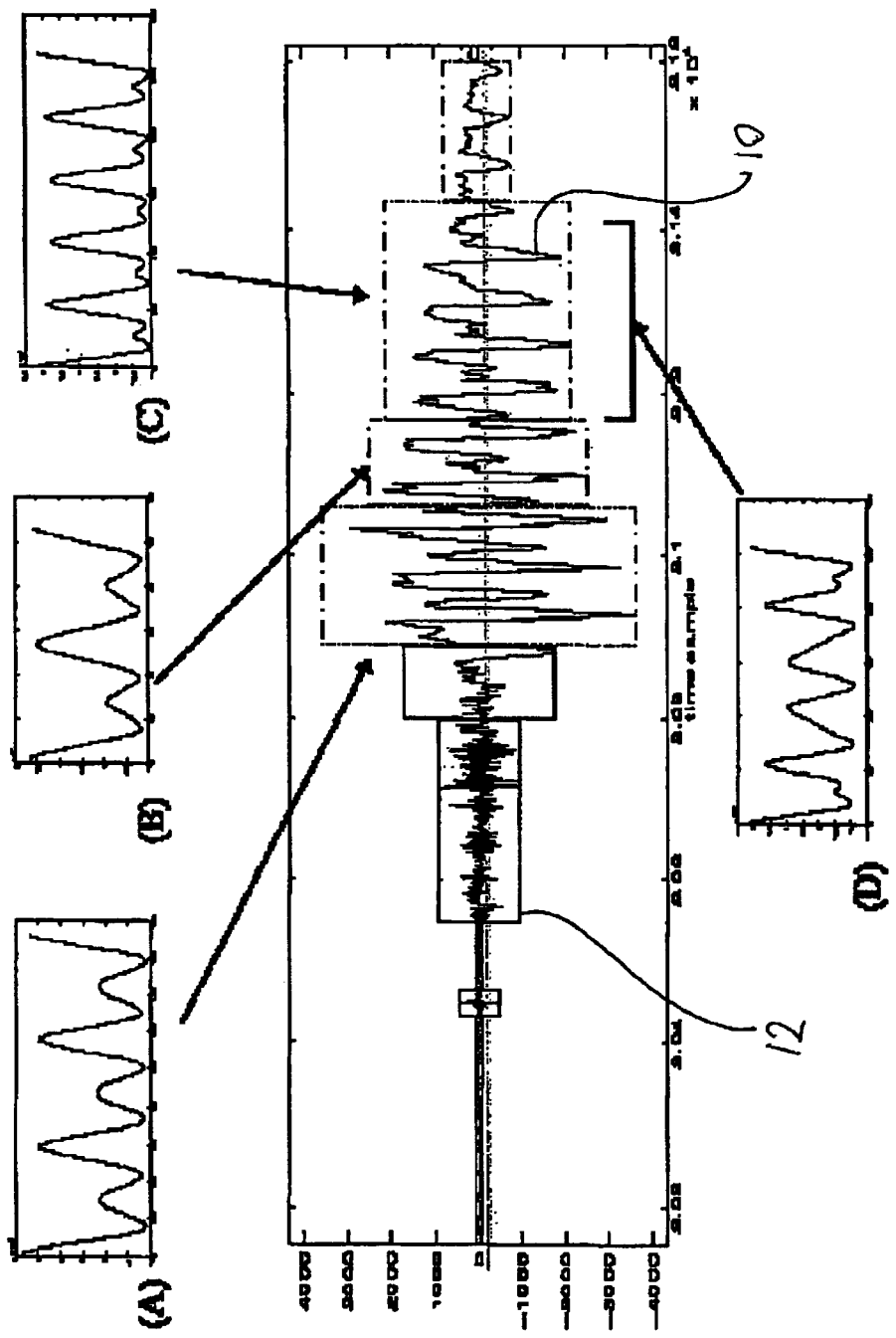
FIG. 2 is an example of segmentation of speech illustrating the result of the method and system of the present invention.

FIG. 2 is an illustration of a segmented speech signal 10. Identified segments 12 are indicated by dash lines. The Autocorrelation Function is provided for three identified segments (A) a (B) and (C). (D) is provided as the autocorrelation function of an arbitrary region of the speech signal that is not indicated by the scoring function as a segment. The segments (A), (B) and (C) enclose well-defined events or periodic (voiced) areas of exactly 3, 2, and 5 pitch intervals, respectively. Further, the illustrated non-windowed ACF functions for these segments begin and end at the same levels showing almost perfect periodicity. The non-windowed ACF for the arbitrary region (D) which is slightly smaller than segment (C) does not have this property. From the example, it can be seen how the segmentation works hand-in hand with the non-windowed ACF.

The key feature of this invention is the use of non-windowed processing which permits fast computation of a spectral feature function such as a DFT or ACF on a sample-by sample basis. Thus, variations of the method include any method that uses the DFT, ACF or other recursively computed spectral feature function, as described herein.

In view of the above detailed description, it is anticipated that the invention herein will have far reaching applications other than those specifically described.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for dividing a signal into segments having similar spectral characteristics comprising the steps of:

receiving n samples of the signal for initial use as n received samples, wherein a received sample being received earliest in time is identified as an oldest sample of said n received samples;

calculating a spectral characteristic function for said n received samples of the signal for initial use as the spectral characteristic function;

generating a table of previous values that contains a scoring value for a best segmentation of received samples and a segment length of a last previously identified segment;

receiving a single current sample of the signal;

computing a new spectral characteristic function based on said received single current sample, said spectral characteristic function, and the oldest sample of said n received samples;

computing a scoring function from said computed new spectral characteristic function wherein the computed scoring function incorporates a reward value for segments exactly matching a pitch interval; and recursively identifying segments of the signal based on the computed scoring function and said table of previous values, said recursively identified segments corresponding to naturally occurring events in the signal between any two received samples thereof and identifying a new spectral characteristic of said signal.

2. The method of claim 1 wherein the spectral characteristic function and the new spectral characteristic function are discrete Fourier transforms, $X_t[k]$, computed on samples $[x_{t-n+1}, \ldots x_t]$, wherein t indicates the single current sample and k is transform variable.

3. The method of claim 2 wherein said step of computing a new spectral characteristic function utilizes the following expression:

$$X_{t+1}[k]=e^{j2\pi k/n}[X_t[k]-(x_{t-n+1}-x_{t+1})].$$

4. The method of claim 1 wherein the spectral characteristic function and the new spectral characteristic function are autocorrelation functions, $r_t[\tau]$, computed on samples $[x_{t-n+1}, \ldots x_t]$, wherein t indicates the single current sample and $\tau$ is a transform variable.

5. The method of claim 4 wherein said step of computing a new spectral characteristic function utilizes the following expression:

$$r_{t+1}[\tau]=r_t[\tau]+(x_{t+1}-x_{t-n+1})(x_{t-n+1}-x_{t+1-\tau})/n.$$

6. The method according to claim 5 wherein said step of recursively identifying segments comprises:

applying a Levinson recursion to compute a score from the computed scoring function and said table of previous value, for every model order up to a preset maximum; and finding a best scoring model order based on the computed score.

7. A method for dividing a signal into segments having similar spectral characteristics comprising the steps of:

receiving samples of the signal for initial use as received samples until n samples are received allowing generation of a spectral characteristic function;

generating a table of previous values that contains a scoring value for a best segmentation of received samples and a segment length of a last previously identified segment;

receiving a current sample of the signal;

computing a new spectral characteristic function for the signal based on said n received samples and said received current sample wherein the new spectral characteristic function is an autocorrelation function, $r_t[\tau]$, computed on samples $[x_{t-n+1} \ldots x_t]$, wherein t indicates the current sample and $\tau$ is a transform variable wherein said step of computing a new spectral characteristic function utilizes the following expression:

$$r_{t+1}[\tau]=r_t[\tau]+(x_{t+1}x_{t-n+1})\,(x_{t-n+1}-x_{t+1-t})/n;$$

computing a scoring function for the signal from said computed new spectral characteristic function; and recursively identifying segments of the signal based on the computed scoring function and said table of previous values, said recursively identified segments corresponding to naturally occurring events in said signal, wherein said step of recursively identifying segments comprises:

applying a Levinson recursion to compute a score from the computed scoring function and said table of previous values for every model order up to a preset maximum; and finding a best scoring model order based on the computed score;

wherein the computed scoring function for a given model order p on a segment of length n is obtained by the equation:

$$Q(p,n)=(-n/2)(\log(\sigma^2[p,n])+1)-(p/2)*\log(n)+k$$

where $\sigma^2$ [p,n] is a prediction error variance, K is a reward value for periodicity, and $(p/2)*\log(n)$ is minimum description length penalty score.

8. The method according to claim 7 wherein the step of computing the scoring function further comprises:

determining a periodicity in a potential segment; and calculating the reward value K based on the determined periodicity.

9. The method according to claim 8 wherein the step of determining the periodicity further comprises:

testing division factors d over a range of expected pitch intervals in a region;

determining the division factor with smallest autocorrelation function lag, $d_{max}$, in set $\{r[0], r[n/d], r[2n/d], \ldots r[n/2]\}$ by testing all division factors d; and establishing the periodicity as $d_{max}$ when $d_{max}$ is greater than a predetermined fraction of r[0].

10. A method for dividing a signal into segments having similar spectral characteristics comprising the steps of:

receiving samples of the signal for initial use as received samples until n samples are received allowing generation of a spectral characteristic function;

generating a table of values that contains a scoring value for a best segmentation of received samples and a segment length of a last previously identified segment;

receiving a current sample of the signal;

computing a new spectral characteristic function for said received current sample and said n received samples;

computing a scoring function from said computed new spectral characteristic function wherein the computed scoring function incorporates a reward value for segments exactly matching a pitch interval; and recursively identifying segments of the signal between any two received samples thereof based on the computed scoring function and said table of values, said recursively identified segments corresponding to naturally occurring events in said received current sample and said n received samples and identifying a new spectral characteristic of said signal;

wherein the new spectral characteristic function is a discrete Fourier transform, $X_t[k]$, computed on samples $[x_{t-n+1} \ldots x_t]$, wherein t indicates the current sample and k is a transform variable; and wherein said step of computing a new spectral characteristic function utilizes the following expression:

$$X_{t+1}[k]=e^{j2\pi k/n}[X_t[k]-(x_{t-n+1}-x_{t+1})].$$

11. A method for dividing a signal into segments having similar spectral characteristics comprising the steps of:

receiving samples of the signal for initial use as received samples until n samples are received allowing generation of a spectral characteristic function;

generating a table of values that contains a scoring value for a best segmentation of received samples and a segment length of a last previously identified segment;

receiving a current sample of the signal;

computing a new spectral characteristic function for said received current sample and said n received samples;

computing a scoring function from said computed new spectral characteristic function wherein the computed scoring function incorporates a reward value for segments exactly matching a pitch interval; and recursively identifying segments of the signal between any two received samples thereof based on the computed scoring function and said table of values, said recursively identified segments corresponding to naturally occurring events in said received current sample and said n received samples and identifying a new spectral characteristic of said signal;

wherein the new spectral characteristic function is an autocorrelation function, $r_t[\tau]$, computed on samples $[X_{t-n+1} \ldots X_t]$, wherein t indicates the current sample and $\tau$ is a transform variable; and wherein said step of computing a new spectral characteristic function utilizes the following expression:

$$r_{t+1}[\tau]=r_t[\tau]+(x_{t+1}-x_{t-n+1})\,(x_{t-n+1}-x_{t+1-t})/n.$$

12. The method according to claim 11 wherein said step of recursively identifying segments comprises:

applying a Levinson recursion to compute a score from the computed scoring function and said table of values for every model order up to a preset maximum; and finding a best scoring model order based on the computed score.

13. The method according to claim 12 wherein the scoring function for a given model order p on a segment of length n is obtained by the equation:

$$Q(p,n)=(-n/2)(\log(\sigma^2[p,n])+1)-(p/2)*\log(n)+k$$

where $\sigma^2[p,n]$ is a prediction error variance, K is a reward value for periodicity, and $(p/2)*\log(n)$ is a minimum description length penalty score.

14. The method according to claim 13 wherein the step of computing the scoring function further comprises:

determining a periodicity in a potential segment; and calculating the reward value K based on the determined periodicity.

15. The method according to claim 14 wherein the step of determining the periodicity further comprises:

testing division factors d over a range of expected pitch intervals in a region;

determining the division factor with a smallest autocorrelation function lag, $d_{max}$, in the set $\{r[0], r[n/d], r[2n/d], \ldots r[n/2]\}$ by testing all division factors d; and establishing the periodicity as $d_{max}$ when $d_{max}$ is greater than a predetermined fraction of $r[0]$.

* * * * *